United States Patent [19]

Lirov et al.

[11] Patent Number: 5,107,497
[45] Date of Patent: Apr. 21, 1992

[54] TECHNIQUE FOR PRODUCING AN EXPERT SYSTEM FOR SYSTEM FAULT DIAGNOSIS

[75] Inventors: Yuval V. Lirov, Aberdeen; On C. Yue, Middletown, both of N.J.

[73] Assignee: AT&T Bell Laboratories, Murray Hill, N.J.

[21] Appl. No.: 386,325

[22] Filed: Jul. 28, 1989

[51] Int. Cl.$^5$ .................... G01R 31/28; G06F 11/00
[52] U.S. Cl. ................................................. 371/15.1
[58] Field of Search ................ 371/15.1; 364/551.01, 364/550

[56] References Cited

U.S. PATENT DOCUMENTS

| | | | |
|---|---|---|---|
| 4,228,537 | 10/1980 | Henckels et al. | 371/23 |
| 4,242,751 | 12/1980 | Henckels et al. | 371/26 |
| 4,633,467 | 12/1986 | Abel et al. | 371/16 |
| 4,680,761 | 7/1987 | Burkness | 371/25 |
| 4,727,545 | 2/1988 | Glackemeyer et al. | 371/23 |
| 4,740,349 | 4/1988 | Loftus et al. | 376/216 |

OTHER PUBLICATIONS

"Clever Computers, Why Should Engineers Use AI?" by Paul Chung and Robert Inder (AM) University of Edinburgh, date unknown.
"Fault Diagnosis" Thomas J. Laffey, IEEE Potentials, Oct. 1986, pp. 8–11.
Yamamoto et al., *New Generation Computing*, vol. 4, No. 4, 1986, pp. 97–105.
Pipitone, *Computer*, vol. 19, No. 7, Jul. 1986, pp. 68–76.
Magliero et al., *Autotestcon'87*, San Francisco, Calif., Nov. 1987, pp. 61–64.
Bursch et al., *Autotestcon'87*, San Francisco, Calif., Nov. 1987, pp. 97–105.
Yoon et al., *IEEE Trans Syst. Man Cybern.*, vol. 18, No. 4, Jul.-Aug. 1988, pp. 659–676.
Masuzawa et al., *Syst. Comput. Japan.*, vol. 19, No. 8, Aug. 1988, pp. 54–67.
Viacroze et al., *ISTFA* 1988, Oct.-Nov. 1988, Los Angeles, Calif., pp. 153–159.
Eighth Annl Intl Phoenix Conf. on Computers and Communications, 1989 Conf. Proc., "A Design Methodology for Expert Systems for Diagnostic and Repair", A. Ghafoor et al, pp. 550–554.
Autotestcon '88 Symposium Proc., IEEE Intl Automatic Testing Conf., "Hybrid Diagnostic Strategy for an Expert System Controlled Automatic Test System (EXATS)", K. W. Pflueger, pp. 41–46.

*Primary Examiner*—Jerry Smith
*Assistant Examiner*—Phung My Chung
*Attorney, Agent, or Firm*—F. B. Luludis

[57] ABSTRACT

The present invention relates to a technique for operation on a computer for developing the knowledge base for ultimately providing very fast and cost-efficient fault diagnosis systems. The present technique uses an effective hierarchy of rules where at a first level are rules which allow the arrangement of the system under test to be decomposed into a hierachy of sequential and parallel subsystems. At the second level are rules that generate the efficient testing rules for each pure subsystem. The second level rules can be compared to a node evaluation function in a typical problem of searching a graph to select the best node for expansion from a current list of candidate nodes, so that the best path to the correct system diagnosis is found in the shortest amount of time using a minimum of user input. Two heuristic rules are applied to speed-up the process of selecting the node as the best candidate for expansion. The resultant hierarchy of rules permit the cost-efficient knowledge base and resultant output test tree procedure to be generated for a fault diagnosis system to be applied for testing an associated device or system.

5 Claims, 2 Drawing Sheets

FIG.3

```
(* at the highest hierarchy level, the circuit consists of *)
(* components 21, S1, and 31 in sequence              *)
measure input to 31;
if passed then check 31
else begin
    measure output from 21;
    if failed then check 21
    else begin (* troubleshooting S1, which consists of S2 and S3  *)
              (*                                      in parallel  *)
              (* first is S2 which consists of 22 and S4 in sequence *)
        measure output of 24 and 25;
        if failed then begin
            measure output of 22;
            if failed then check 22
            else begin (* S4 consists of 24 and 25 in parallel *)
                measure output of 25;
                if failed then check 25
                else check 24
            end
        else begin (* next is S3 *)
            measure output of 27;
            if failed then begin
                measure output of 23;
                if failed then check 23
                else check 27
            end
            else begin
                measure output of 30;
                if failed then begin
                    measure input to 30
                    if failed then begin
                        measure output of 26;
                        if failed then check 26
                        else check 28
                    end
                    else check 30
                end
                else check 29
            end
        end
    end
end
```

TECHNIQUE FOR PRODUCING AN EXPERT SYSTEM FOR SYSTEM FAULT DIAGNOSIS

TECHNICAL FIELD

The present invention relates to a computer-implemented technique for providing very fast and cost-efficient fault diagnosis systems which uses a hierarchy of rules in a knowledge base.

DESCRIPTION OF THE PRIOR ART

Testing methods for fault diagnosis in various circuits and systems have been recognized as a goal for many years. Early testing methods required a testing procedure to be devised and a tester to physically perform each test of the sequence and determine whether or not a fault occurred from the test step. In more recent years, some or all of the design of the testing procedure and the performance of actual testing steps have been automated using computer-based arrangements. In this regard see, for example, U.S. Pat. Nos. 4,228,537 and 4,242,751 issued to L. P. Henckels et al. on Oct. 14, 1980, and Dec. 30, 1980, respectively. In the earlier Henckels et al. patent, on-line simulation of circuit faults was used to generate a small part of a complete dictionary for a mini-computer based automated test system needed for diagnosing a circuit. This computer based test system includes only a small amount of secondary storage and is adapted for an exact match diagnosis with modeled failures, and a heuristic approach for a partial match of faulty behavior that lead to a highly probable diagnosis. The later Henckels et al. patent discloses an automatic fault detecting computer system wherein external control is provided for introducing intelligence into the probing of circuit board nodes where insights into predictable or likely failures are available. More particularly, the look-ahead computer-guided probe makes use of a partial fault dictionary to supply predictions of fault location, based on the faulty behavior of the Unit Under Test (UUT). Instead of tracking the faulty behavior back from an edge connector of a board, the system automatically instructs the operator to probe the point at which a fault is predicted.

Expert systems have also been applied to diagnostic activities. In this regard see, for example, the article entitled "An Expert System For Help To Fault Diagnosis On VLSI Memories" by T. Viacroze et al. published in the Journal for the *International Symposium For Testing and Failure Analysis* (ISTFA), October-November 1988 at Los Angeles, Calif. at pages 153-159. The disclosed system infers rules by taking into account the many models of faults which can be found in a type of memory. A self documentable historical data base containing the conclusions of the electrical diagnosis performed by the Expert System, and the results of the technological analysis is used for statistical studies. The system first analyzes the data from the tester and infers the adequate rules and information available within the archive data base. The second level analysis by the computer is performed by a dialog with the operator. Finally, a fault assumption is generated, using probability coefficients, on a minimum functional block of the memory, and such assumption is verified providing forward and backward reasoning.

When constructing expert diagnostic systems, one is usually concerned with the well-known "knowledge acquisition bottleneck", where the knowledge base is the heart of the expert system and involves the construction of the rules specific to the task domain. The rules of the diagnostic expert system produce directions to a sensor-based system as to what, where and when to measure or replace in the system under test. One approach which can be adopted for dealing with this problem is based on a semantic control paradigm which is utilized to model the diagnostic/repair process, and the task of the semantic control procedure is to construct in real-time, the required relations, so that, when executed, the overall objective of the control process is achieved. The known procedures have produced long and expensive sequences, and the problem remaining in the prior art is to provide a technique for the automated generation of efficient diagnostic procedures which include reasonably short and inexpensive sequences of measurement.

SUMMARY OF THE INVENTION

The foregoing problem in the prior art has been solved in accordance with the present invention which relates to a computer-implemented technique for the automated generation of diagnostic procedures that use a particularly effective hierarchy of rules. More particularly, a first level of rules produces a decomposition of a system being diagnosed into groups of sequential and parallel subsections or subsystems. In this regard, a system is first decomposed into its main serially grouped sections, and then each main section which includes parallel connected components is further decomposed, if possible, into its major serial and parallel grouped subsections, which process is reiterated until each section has been decomposed as much as possible into a serial string. At the second level are rules that generate the efficient testing rules for each pure subsection obtained from the decomposition process. The second level rules can be compared to a node evaluation function in a typical problem of searching a graph to select the best node for expansion from a current list of candidate nodes, so that the best path to the correct system diagnosis is found in the shortest amount of time using a minimum of user input. Two heuristic rules are applied by the second level rules to speed up the process of selecting the node as the best candidate for expansion to achieve a very cost efficient and fast fault detection system.

Other and further aspects of the present invention will become apparent during the course of the following description and by reference to the accompanying drawings.

BRIEF DESCRIPTION OF THE DRAWINGS

FIG. 3 is a test tree sequence for testing the circuit pack arrangement of FIG. 2 as derived in according with the rules of the present invention.

DETAILED DESCRIPTION

The present invention relates to a technique for system fault diagnosis and, more particularly, to a technique for developing the knowledge base of any diagnostic expert system. As defined hereinbefore, the knowledge base usually consists of rules specific to the task domain and produce directions to a sensor-based system as to what, where, and when to measure or replace in the system under test. Efficiency of such a knowledge base is determined by the cost of the average test sequence. This cost is computed from the costs of measurements, failure rates of different components of the system, configuration or topology of the system, and the structure of the diagnostic rules. Currently used methods and computer programs for the automated generation of a knowledge base when given the above elements have produced inefficient knowledge bases resulting in a diagnostic expert system with unnecessarily long and expensive sequences of measurements.

Since circuit packs are the building blocks of all electronic equipments, the following discussion of the present invention will be directed to producing a knowledge base for a circuit pack which usually comprises a printed wiring board and components such as integrated circuits, resistors, capacitors, switches, and relays. It should be understood, however, that the present invention can also be used for providing knowledge bases and testing of other systems, and should not be limited to just circuit packs. As factories employ computed integrated manufacturing (CIM) techniques to (1) reduce work-in-progress (WIP) inventory, and (2) shorten manufacturing interval and improve quality; technicians responsible for diagnosing defective circuit packs should be able to troubleshoot any one from a large variety of products by adjusting the testing procedures to incorporate the latest component and process quality information, and learn to analyze new products quickly. In response to this increased demand for flexibility in the test and repair area, an expert system has been developed which suggests the tests to be performed to determine the cause of defect by consulting a database of circuit information and testing procedures and suggest which component(s) to replace.

Figure 1:
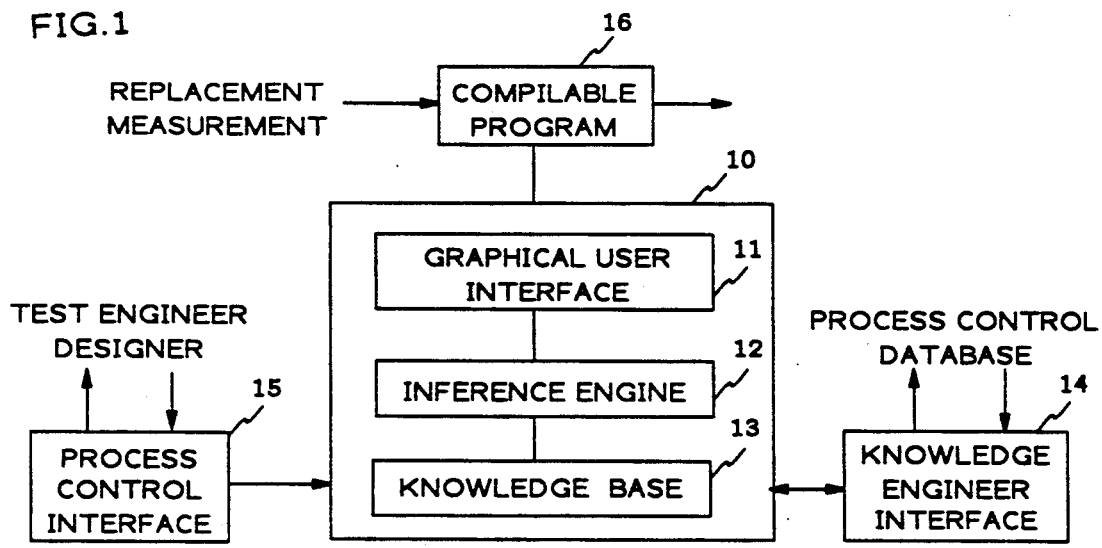
FIG. 1 is a block diagram of a controller for practicing the present invention.

As shown in FIG. 1, this expert system 10 consists of a graphical user interface 11 controlled by an inference engine 12 which is driven by a knowledge base 13. The expert system 10 (1) accepts specifications of the diagnostic strategy and descriptions of the electronic unit under test (UUT) from a process control interface 14 and/or knowledge engineer interface 15 that uses a process control database as the basic design blocks, and (2) automatically transforms these specifications into compilable code (CP) 16 by using the knowledge base 13 about the UUT, programming structures and general diagnostic strategies. The present interface 11 is effectively a Graphical Diagnostic Expert System (GDES) which bridges between the expert system 10 and a team comprising a test engineer, circuit pack troubleshooter and development programmers which work via interface 15 to construct and maintain the underlying circuit pack troubleshooting expert system. Interface 11 can be used to generate a database 13 of diagnostic rules, where the rule generation algorithm is based on the syntactic relations between the nodes of a graphical diagnostic tree. It is to be understood that the diagnostic knowledge base 13 can be developed in any suitable computer language as, for example, PROLOG, where the meta-programming techniques of PROLOG, coupled with object-oriented programming, all for efficient and fast implementation of the present expert system 10. Such meta-programming can create interactively the predicates and objects pertaining to the diagnostic reasoning, e.g., rules, advice, etc.

Specifically, the present Computer Aided Design (CAD) expert system uses a search of the knowledge base to aid the design of the troubleshooting computer programs which are to be used to assist the human troubleshooters. Such system must be able to develop a strategy given the description of the circuit and its behavior. The key to the present approach is to solve a test sequencing problem always for a purely sequential or a purely parallel case, since such approach allows for direct computation of the expected cost of the test sequence, thus allowing for its explicit minimization. To provide a technique for the automated generation of efficient diagnostic procedures which include reasonably short and inexpensive sequences or measurement, the present invention uses a particularly effective hierarchy of rules.

A first level of rules produces a decomposition of a system into groups of sequential and parallel subsections or subsystems. More particularly, the decomposition rules are as follows:

Rule 1: if all components are connected in parallel then construct a single "par" node node.

Rule 2: if all components are connected in sequence then construct a single "seq" node.

Rule 3: if all component sequences have a common prefix component then subdivide the "par (seq)" node into a "seq (par)" node of two "seq" nodes, one with the prefix component and the other comprising the rest of the components.

Rule 4: if several "par" subnodes of a common "seq" node have common suffixes/prefixes, then delete them from the "par" subnodes and insert them into the common "seq" node in the same order.

Figure 2:
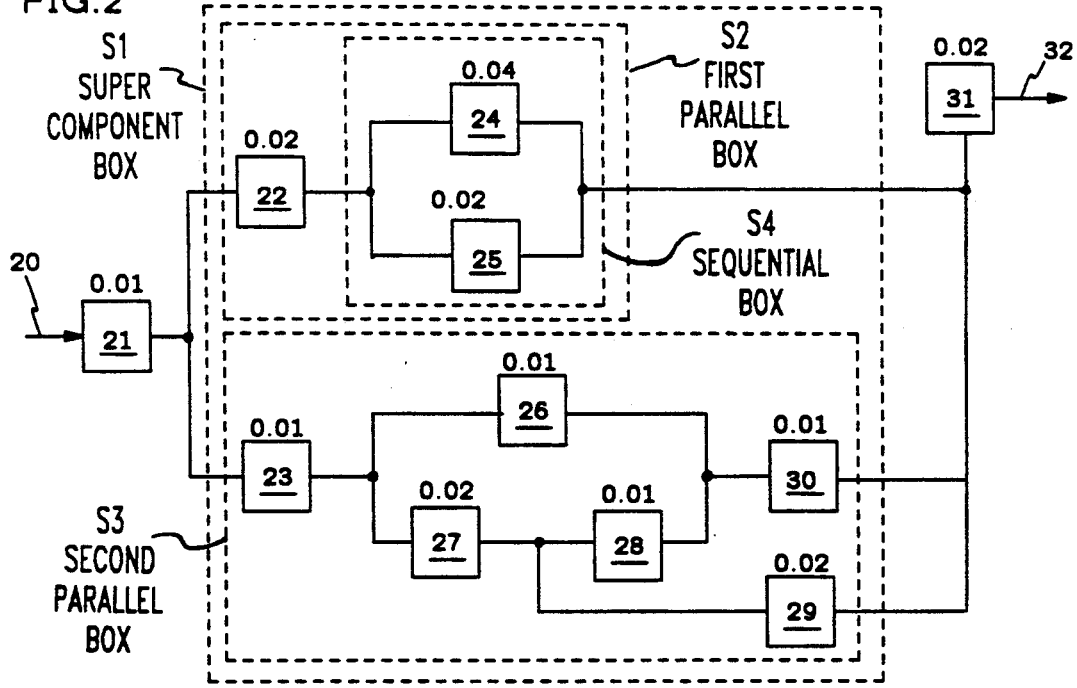
FIG. 2 is a block diagram of an exemplary hybrid circuit pack arrangement for illustrating the principles of the present invention.

To first illustrate the first level of decomposition rules, consider the circuit pack arrangement of FIG. 2. The circuit pack arrangement of FIG. 2 comprises components 21–31 connected in various serial and parallel components with the input to the circuit pack being at 20 and the output at 32, and each component has an unweighted probability of failure as indicated above the component box. To appropriately decompose such arrangement, a small rule-based knowledge system is constructed in knowledge base 13 of FIG. 1 so as to provide the present expert system with the ability to make abstractions of the circuit pack of FIG. 2. Using this knowledge system, a general pattern (either sequential or parallel) is asserted initially. Then the components that do not fit into the chosen general pattern as aggregated into the "super component" level. More particularly, in FIG. 2 the circuit pack arrangement can initially be decomposed into it main serially grouped section including a serial arrangement of three boxes comprising a first box of component 21, a final box of component 31, and a central "super component" box of components 22–30 per Rules 1–3 above which can be designate as S1. A next decomposition step can start to decompose the central "super component" box using Rule 1–4 above. For example, the central super component box S1 of components 22–30 can be decomposed into two parallel boxes, with a first super component box including components 22, 24 and 25 and designated S2, and a second super component box including the remaining components 23 and 26–30 and designated S3. A third decomposition step might decompose the first super component box S2 of components 22, 24 and 25 into two sequential boxes with a first one of the boxes including component 22 and the second box in the series including the super component box of components 24 and 25 designated S4. It is to be understood that the remaining components of the second super component box S3 of components 23 and 26–30 can be decomposed in a similar manner where possible.

Having decomposed the circuit pack arrangement, four test tree generation rules are applied to such decomposed arrangement where a test tree is known in the art and is obtained by attaching circular nodes to the single links to provide a tree configuration of ambiguity sets and choice sets. The present test tree generation rules are:

Rule 1: if the node is a "par" node, then its cost "c" is computed from $$c(node) = \min_i \{c(t_i) + q_i c(subnode_i)\}$$

where i runs over all possible partitions, $c(t_i)$ is the cost of performing test $t_i$, $q_1$ is the subnode$_i$ probability, and the best test is determined from $$t_i = \arg\min c(node).$$

Rule 2: if the node is a "seq" node, then the cost "c" is computed from $$c(node) = \min_i \{c(t_i) + p_i c(leftsubnode_i) + q_i c(rightsubnode_i)\}$$

where i runs over all possible partitions, left subnode corresponds to the node obtained when test $t_i$ passed, right subnode when test $t_i$ failed, and the best test is determined from $$t_i = \arg\min c(node).$$

Rule 3: If the node is a "par" node, then its lower bound cost, the lowest cost possible for a node and also termed a cost underestimate, is computed from the exemplary steps:

Sort failure rates of components numerically in a first ascending or descending order into a list P.
Sort test costs of components numerically in a second descending or ascending order opposite the first order into a list L.

h ← 0 q ← 1 repeat the following steps:
  select first member c from L h ← h + c·q select last member p from P q ← q − p until the number of elements in P = 1.

The above rule includes steps where (1) failure rates of the various components of each subsystem are sorted numerically into a list P in a first ascending or descending order in the knowledge base; (2) the test costs of the same components are sorted numerically into a list L in the knowledge base in a second descending or ascending order which is opposite the first order; and (3) summing the product of each of the corresponding failure rates q and test costs c in lists P and L according to $\Sigma q_i c_i$. Such summing of the products can be performed by the variables h and q being initialized to 0 and 1, respectively, and a loop being performed where a first cost is selected from the list L, and the current value of variable h being added to the cost updated with the current value of variable q and stored as the new value of h, a last member of the list P being selected and the current value of the variable q being added to the current value of p and stored as the new value of q. The loop is reiterated until the list P only has one element remaining.

Rule 4: if the node is a "seq" node, then its lower bound cost, or cost underestimate, is computed from the steps of:

Sort failure rates numerically in a first ascending or descending order into P.
Sort test costs numerically in the first ascending or descending order into L.

h ← 0 repeat the following steps:
  select first two members $p_i$ and $p_2$ from P p ← p1 + p2 select first member c from L h ← h + p·c insert p into P in an ordered form
until p = 1.

The sequence of Rule 4 can easily be determined from the explanation of the sequence provided for Rule 3. Having determined the lower bound costs, the diagnostic knowledge base is derived according to Rules 1 and 2. The above rule-base produces an efficient diagnostic knowledge base when used by a standard branch-and-bound search procedure. When the circuit pack arrangement of FIG. 2 is submitted as an input to the above designated procedure, the arrangement of FIG. 1 produces a diagnostic knowledge base test tree depicted in FIG. 3. From the test tree of FIG. 3 it can be seen that decomposition rules 1–4 were used decompose the circuit pack arrangement of FIG. 2 as outlined hereinbefore, and that the test tree generation rules determined the points in the decomposed element where the sequence of tests should be performed to produce a fast and cost efficient fault diagnosis program. It is to be understood that there are many other diagnostic sequences that could be performed to test the circuit pack arrangement of FIG. 2, but the present invention produces a knowledge base that produces a the fast and cost-efficient fault diagnosis program.

What is claimed is:

1. A method of forming a knowledge base in a computer for producing an expert system for diagnosing a predetermined arrangement of a system to determine if the system contains a fault, said system comprising a plurality of components having respective predetermined failure rates, the method comprising the steps of:

(a) decomposing the system into groups of sequential and parallel subsystems, each of said subsystems comprising at least one of said components;

(b) generating a tree structure of the groups of step (a) by attaching nodes to each parallel and sequential link between subsystems in the tree to provide a tree configuration of sets of components suspected of being faulty and possible choice measurement sets;

(c) computing a lower bound cost of a sequence of tests for each of the parallel and sequential subsystems using a first rule that (1) if a node is a parallel node, then the lower bound cost for that node is computed by (i) sorting numerically and in a first predetermined order a first list P of the failure rates of the components of each subsystem, (ii) sorting numerically and in a second predetermined order a second list L of test costs of the components of each subsystem, and (iii) for corresponding elements in lists P and L, computing a product of each of the corresponding elements, and (2) a second rule that if the node is a sequential node, then the lower bound cost of the sequence of test cases for that node is computed by (i) separately sorting numerically and in a predetermined order each of the failure rate and the test cost for each component of each subsystem in the first and second lists P and L, respectively, (ii) initializing a variable h to zero, (iii) selecting the lowest valued two numbers $p_1$ and $p_2$ from the list P, (iv) computing a current value for a failure rate p by summing $p_1$ and $p_2$ (v) selecting a first member c from list L, (vi) summing the current value of h with the product of the value of $p_1$ and $p_2$ from step (iv), and placing such sum for the current value for h, (vii) inserting the current value of p in numerical order in list P, and (viii) repeating steps (iii) to (vii) until p=1; and (d) generating a diagnostic knowledge base for generating a diagnostic fault testing sequence at an output of the computer.

2. The method according to claim 1 wherein in computing step (iii) for the lower bound cost for a parallel node performing the steps of:

(c1) initializing a first and second variable h and q to 0 and 1, respectively;

(c2) selecting a first member c from list L;

(c3) computing the product of h+c·q and substituting such value for the current value of h;

(c4) selecting a last member p from list P;

(c5) subtracting the selected member p in step (c4) from the current value of q and substitute such subtracted value as the current value of q; and (c6) repeating steps (c2) to (c5) until the number of elements in list P=1.

3. The method according to claim 1 wherein in performing step (d) performing the step of:

(d1) the computer computing the lower bound cost for the test cases of a parallel node in accordance with an expression defined by $$c(\text{node}) = \min_i \{c(t_i) + q_i c(\text{subnode}_i)\}$$

where i includes all possible partitions of the system, $q_i$ is a subnode$_i$ probability, and the choice measurement set is determined from $$t_i = \arg \min c(\text{node}).$$

4. The method according to claim 1 wherein in performing step (d) performing the step of:

(d1) the computer computing the lower bound cost for the test cases of a sequential node in accordance with an expression defined by $$c(\text{node}) = \min_i \{c(t_i) + p_i c(\text{leftsubnode}_i) + q_i c(\text{rightsubnode}_i)\}$$

where i includes all possible partitions of the system, left subnode corresponds to the node obtained when test $t_i$ passed, right subnode corresponds to the node obtained when test $t_i$ failed, and the choice measurement set is determined from $$t_i = \arg \min c(\text{node}).$$

5. A method according to claim 1, wherein in performing steps (a) and (b), performing the steps of:

(e1) constructing a single parallel node if all of the components of the system are connected in parallel;

(e2) constructing a single sequential node if all of the components of the system are connected in sequence;

(e3) subdividing a parallel node into a sequence of a two nodes, with one of said two nodes comprising a common prefix component and the other one of said two nodes comprising all remaining components, if said common prefix component is common to all component sequences of said parallel node; and (e4) if several parallel subnodes of a super component sequence node include common prefixes or suffices, then deleting such parallel subnodes and inserting parallel subnodes into the super component sequence node in a predetermined order.

* * * * *